3,467,684
FATTY ACID-DIGLYCIDYL ETHER-ALKYLENE-
POLYAMINE COMPOSITIONS
Robert E. Lane, Lake Jackson, Tex., assignor to The Dow
Chemical Company, Midland, Mich., a corporation of
Delaware
No Drawing. Filed May 16, 1966, Ser. No. 550,114
Int. Cl. C08g 33/06; C11c 3/00
U.S. Cl. 260—404.5                              6 Claims

ABSTRACT OF THE DISCLOSURE

This invention relates to a new water-dispersible polyamine condensation product particularly suitable for the foam concentration of heavy metal values. These novel polyamine products have the formula:

(I)

wherein

R is a $C_{15}$–$C_{19}$ alkyl or alkenyl group,
each R' individually is H or $CH_3$, and
$a$ is an integer from 1–6.

In these polyamines, a long chain alkyl or alkenyl ester is coupled through a hydrophilic hydroxyalkyl ether to an alkylenepolyamine to form a particularly active additive for the selective concentration of copper and other heavy metal ions in aqueous solution.

BACKGROUND

Many fatty esters and amides are known. Because of their varied functionality, they are widely used as curing agents for epoxy resins and as intermediates for chemical synthesis. However, the new polyamines described herein have a novel combination of properties which makes them useful not only as curing agents and intermediates, but also as selective reagents for the recovery of heavy metal values from aqueous solution.

STATEMENT OF INVENTION

It has now been discovered that the monoepoxyester obtained by condensation of a $C_{16}$–$C_{20}$ fatty acid and diglycidyl ether can be further condensed with an alkylenepolyamine of the formula:

$$NH_2(CHR'—CHR'NH)_aH \qquad (II)$$

wherein each R' individually is H or $CH_3$, and $a$ is an integer from 1–6, to yield new polyamine products of the formula:

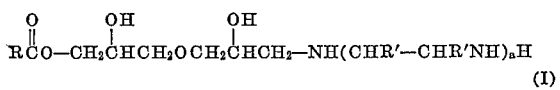

(I)

useful in the foam concentration of heavy metal ions in aqueous solution. These compositions have a suitable balance in water-solubility, detergency and chelation strength so that when added to an aqueous solution containing dissolved heavy metals such as copper and iron, a stable foam enriched in heavy metal content will form when the aqueous solution is vigorously stirred or purged with air. The foam can then be stripped from the bulk of the aqueous solution and broken to yield an aqueous concentrate enriched in the heavy metal values.

GENERAL DESCRIPTION

Essential herein is a $C_{16}$–$C_{20}$ alkyl or alkenyl monocarboxylic acid such as palmitic, oleic, stearic, linoleic, linolenic, or abietic acid. Mixtures such as tall oil, a commercial fatty acid consisting primarily of oleic acid with moderate amounts of polyunsaturated $C_{16}$–$C_{20}$ fatty acids, are often most suitable. The long chain alkyl or alkenyl group of these acids is required for proper detergency.

To prepare the intermediate monoepoxyester or corresponding ester chloro- or bromohydrin, the fatty acid is condensed with an excess of diglycidyl ether or an equivalent halohydrin such as glycidyl epichlorohydrin, glycidyl epibromohydrin, or bis(3-chloro-2-hydroxypropyl) ether. The process of Newey U.S. Patent 2,940,986 is particularly effective. In this reaction diglycidyl ether and the corresponding halohydrins are essentially equivalent provided that sufficient base is used to neutralize the by-product HCl or HBr. When the esterification is essentially complete, the excess diglycidyl ether is removed from the epoxyester by distillation, extraction or other means to a residual level of 5 percent or less prior to reaction with the alkylenepolyamine.

Then to provide the terminal amino groups required for effective chelation of the heavy metal ions, the intermediate monoepoxyester is condensed with an alkylenepolyamine of the formula:

wherein each R' individually is H or $CH_3$, and $a$ is an integer from 1–6.

Operable alkylenepolyamines include ethylenediamine, diethylenetriamine, pentaethylenehexamine, 1,2-propylenediamine, tripropylenetetraamine, and other 1,2-alkylenepolyamines containing up to 6 alkylene groups per molecule. Polyethylenepolyamines (II, R'=H) are often preferred. Mixtures are suitable, but higher alkylenepolyamines give compositions which are less active in the foam concentration process.

Reaction of the fatty acid monoepoxyester of the corresponding halohydrin with the alkylenepolyamine occurs readily at 20°–50° C. At least two and preferably 5–10 moles of the alkylenepolyamine are used to minimize formation of adducts containing more than one ester group per molecule. With such an excess of polyamine, reaction of the epoxyester occurs largely with the primary amino groups although some reaction may also occur at a secondary amino group. If an esterhalohydrin is used, it may be desirable to add sodium hydroxide, potassium bicarbonate or other suitable base to neutralize the by-product haloacid.

Condensation of the epoxyester and alkylenepolyamine at 20°–50° C. normally requires about 0.5–5 hours. Higher temperatures can be used, but generally are not necessary. Thereafter the excess alkylenepolyamine is removed, preferably by distillation at reduced pressure to obtain a viscous water-soluble or dispersible, amber liquid or semi-solid having an amino equivalent weight and hydroxyl content corresponding to a compound of Formula I.

These new polyamines are excellent hardeners for epoxy resins and adhesives. In addition it was discovered that they foam copiously in aqueous solution and form stable complexes with such heavy metal ions as copper and iron. For example, addition of a tall oil-diglycidyl ether-diethylenetriamine adduct to a copper nitrate solution gave a clear deep blue solution which readily foamed when air was passed through it. Analysis of the foam indicated that the copper was concentrated as a complex containing about 2 moles of the tall oil adduct per mole of copper. Similar results have been obtained with $Fe^{+3}$ and $Co^{+2}$. Foam beneficiation with the novel polyamine compositions described herein can also be obtained with other heavy metal ions which form similar amine complexes in aqueous solution.

The following examples illustrates further the present invention. Unless otherwise specified all parts and percentages are by weight.

Example 1.—Tall oil-diglycidyl ether-pentaethylenehexamine

A. To 67 parts (0.23 mole) of tall oil (Arizona Chemical Co. Tall Oil FA3, a mixture of 51 percent oleic acid, 40 percent unconjugated polyunsaturated fatty acids and 7 percent conjugated polyunsaturated fatty acid having a total fatty acid content of 98.7 percent, an acid number of 198 and an iodine value of 130) was added 325 parts (2.5 moles) distilled diglycidyl ether and 0.25 part triethylamine as catalyst. The mixture was stirred at about 75° C. for 9 hours with periodic sampling and analysis for residual free acid. When there was less than 3 percent residual acid, the esterification mixture was rapidly cooled to room temperature and a small amount of cold sulfuric acid added to neutralize the amine catalyst. Excess diglycidyl ether was stripped by distillation to a pot temperature of about 80° C. at 0.5 mm. Hg or less. The residual product was an amber liquid ester having a viscosity of 82 cps. at 25° C. and a total epoxide content of 11.7 percent. It contained about 3.8 percent residual diglycidyl ether. The epoxide content corrected for residual diglycidyl ether indicated a purity of about 95 percent.

In other runs it was found that without the amine catalyst, esterification required a temperature of about 95–100° C. Also the residual traces of diglycidyl ether can be removed by extraction with carbon tetrachloride or ether.

B. To 248 parts (1.0 mole based on epoxyester content) of a tall oil-diglycidyl ether epoxyester prepared as described in part A was added 1860 parts (8 moles) of pentaethylenehexamine. The mixture was stirred with heating at about 40° C. for an hour. After stripping the excess amine to a pot temperature of 130–140° C. at 0.1 mm., there was obtained 718 parts of an amber liquid having a viscosity of 4810 cps. at 25° C., a hydroxyl content of 6.09 percent, and an amine equivalent weight of 59.

C. Using the pentaethylenehexamine adduct as an epoxy hardener, 59 parts of the product described in part B was mixed with 188 parts of a bisphenol A epichlorohydrin epoxy resin having an equivalent weight of 188. The mixed resin system was cured at 80° C. for 18 hours. The resulting plastic had a tensile strength of 11,735 p.s.i., an elongation of 8.8 percent, an Izod impact strength of 0.55 ft.-lb./in. notch and a "Shore D" hardness of 86.5. The cured resin was very resistant to absorption of both water and toluene. The partially cured resin was an excellent structural adhesive.

Example 2.—Stearic acid-diglycidyl etherdiethylenetriamine

A. Following the general procedure of Example 1A, a mixture of 284.5 parts (1 mole) stearic acid, 1302 parts (10 moles) diglycidyl ether and 0.45 part triethylamine was heated at 70–75° C. for 7 hours. After cooling the amine was neutralized with 0.7 part sulfuric acid and the excess diglycidyl ether stripped in vacuo. A crystalline epoxy ester, M.P. 43–46° C., was obtained which had an epoxide content of 10.2 percent.

B. The epoxy stearic ester was reacted with about 7 moles of diethylenetriamine at 35–40° C. to yield a viscous amber liquid polyamine with an amine equivalent weight of about 87.

Example 3.—Other polyamines

Following the general procedures given in Examples 1 and 2, other polyamines have been prepared from $C_{16}$–$C_{20}$ fatty acid epoxyesters. Properties of several other typical products are given in Table 1.

TABLE 1.—FATTY ACID-DGE-POLYAMINE COMPOSITIONS

| Compound | Fatty Acid | Ether [1] | Alkylene-polyamine [2] | Product | Visc. 25° C., cps. | Amine. eq. wt. |
|---|---|---|---|---|---|---|
| 1 | Tall Oil | DGE | PEHA | Amber liquid | 4,810 | 59 |
| 2 | Stearic Acid | DGE | DETA | do | | 87 |
| 3–1 | Tall Oil | DGE | DETA | do | 32,000 | 91 |
| 3–2 | do | DGE | TETA | do | 34,000 | 81 |
| 3–3 | do | DGE | TEPA | do | 23,000 | 71 |

[1] DGE=Diglycidyl ether.
[2] DETA=Diethylenetriamine; TETA=Triethylenetetramine; TEPA=Tetraethylenepentamine; PEHA=Pentaethylenehexamine.

Example 4.—Foam froth concentration of heavy metal ions

The new polyamine compositions described in Examples 1–3 are effective reagents for the foam concentration of heavy metal ions in aqueous solutions. Essentially the heavy metal ions are complexed by the reagent. Then when a gas such as air is passed through the aqueous solution a stable foam containing an enriched concentration of the heavy metal ion is formed.

A. Preliminary tests of an aqueous solution containing up to 20,000 p.p.m. of the tall oil-diglycidyl ether-diethylenetriamine adduct (compound 3–1) and varying amounts of copper nitrate indicate a formation of a complex containing 2 moles of adduct per mole of $Cu^{+2}$. Even gentle shaking was sufficient to form a stable foam. Similar results were observed with this reagent and $Fe^{+3}$ and $Co^{+2}$. With $Fe^{+2}$ oxidation to $Fe^{+3}$ also occurred. The other polyamine compounds in Table 1 also had the requisite balance of water-solubility, detergency, and chelation strength for foam concentration. The foam characteristics and process efficiency were influenced both by the nature of the heavy metal cation and by the specific properties of the test reagent.

B. To illustrate the foam benefication process, an aqueous mixture containing about 500 p.p.m. of the diethylenetriamine adduct (3–1) and approximately an equivalent amount of copper nitrate was placed in a plexiglass column fitted with a glass frit at the base and a takeoff tube mounted about 45 cm. above the liquid level. Then air at a velocity of about 100 ml./min. was passed through the glass frit into the aqueous solution. The copious foam rose in the column and passed through the delivery tube into a collection vessel. The foam was destroyed with several drops of a silicone antifoam additive and the resulting concentrate analyzed for $Cu^{+2}$. Successive fractions of the defoamed copper concentrate were found to contain from 2.0–11.4 times as much $Cu^{+2}$ as the remaining initial copper nitrate solution.

I claim:
1. A water-dispersible polyamine of the formula:

wherein

R is a $C_{15}$–$C_{19}$ alkyl or alkenyl group,
each R' individually is H or $CH_3$, and
$a$ is an integer from 1–6.

2. The polyamine of claim 1 wherein the ester RCOO— is an ester of stearic acid.
3. The polyamine of claim 1 wherein the ester RCOO— is a tall oil ester.
4. The polyamine of claim 1 wherein each R' is H.
5. The polyamine of claim 4 where $a$ is 2.
6. The polyamine of claim 4 where $a$ is 5.

References Cited

UNITED STATES PATENTS 2,940,986   6/1960   Newey _____ 260—348

OTHER REFERENCES

Chem. Abstracts, vol. 52, p. 11760g.
Chem. Abstracts, vol. 53, p. 5170i.
J. Org. Chem., vol. 28, p. 2286.

ALEX MAZEL, Primary Examiner
R. V. RUSH, Assistant Examiner

U.S. Cl. X.R.

75—108; 260—2, 438.1